United States Patent

[11] 3,539,001

[72] Inventors William B. Binnix;
　　　　　　　Donald B. Binnix, Fallentimber,
　　　　　　　Pennsylvania 16639
[21] Appl. No 756,668
[22] Filed Aug. 30, 1968
[45] Patented Nov. 10, 1970

[54] TIME-METERED MOVABLE THROAT DRAWOFF
32 Claims, 8 Drawing Figs.
[52] U.S. Cl. .................................................. 209/475,
　　　　　　　　　　　　　　　　　　　　　　　209/495
[51] Int. Cl. ............................................... B07b 3/12,
　　　　　　　　　　　　　　　　　　　　　　　B03b 11/00
[50] Field of Search ........................................ 209/44,
　　474, 475, 476, 466—469, 490, 491, 494—496

[56] References Cited
UNITED STATES PATENTS
2,161,500  6/1939  Bird ............................ 209/495X

| 3,065,853 | 11/1962 | Binnix | 209/468 |
| 3,066,800 | 12/1962 | Binnix | 209/475 |
| 3,246,756 | 4/1966 | Binnix | 209/475 |
| 3,278,029 | 10/1966 | Binnix | 209/475 |
| 3,424,309 | 1/1969 | Binnix | 209/44 |

Primary Examiner—Frank W. Lutter
Attorney—Carothers and Carothers

ABSTRACT: The method and apparatus for selectively classifying minerals and other materials of predetermined size and specific gravity and more particularly to the method and apparatus for selectively classifying, by positive removal, at preselected locations from the underside of a downwardly sloping and traveling material bed, suspended by pneumatic pulses to stratify according to their specific gravity, according to a predetermined size and specific gravity or range thereof through positive removal by metering the discharge of the material at the preselected locations along the flowing bed in accordance with their size and specific gravity.

INVENTORS,
WILLIAM B. BINNIX &
DONALD B. BINNIX
BY
CAROTHERS & CAROTHERS
THEIR ATTORNEYS

Patented Nov. 10, 1970

INVENTORS
WILLIAM B. BINNIX &
BY DONALD B. BINNIX

CAROTHERS & CAROTHERS

THEIR ATTORNEYS

TIME-METERED MOVABLE THROAT DRAWOFF

The separation of minerals or materials by pneumatic stratification or pneumatic fluidizing is by no means a relatively new art. However, an effective control of such stratification to draw-off, efficiently as well as with rapidity, minerals or materials of a different specific gravity and separate the same from waste materials has been a gross and complex problem in the art of separator apparatus. The complexity arises, basically, because of the varying of and the vast differences and change in characteristics of the materials to be separated whether they are or are not the selected and desired mineral. Control for efficient separation was first disclosed in U.S. Letters Pat. No. 3,065,853, wherein provision was made for controlling effectively the separation of materials at the end of the separator, the control responding, quickly to varying characteristic changes such as size and weight, of the materials entering the separator for stratification.

The problem of efficient separation from a mass of materials, a mineral or material of predetermined size and specific gravity had, however, not been efficiently obtained. Thus, more improvement was needed than the control of a mere raw feed material separator. A stratification employing the principles of classification as well as separation was needed to more effectively and efficiently to, first, pneumatically separate the mass of materials into strata layers according to specific gravity of the various materials and, secondly, intermittently draw from the changing strata layers materials not only of the same specific gravity but also of the same size or range size. Such a method and apparatus for a classifier is set forth in my U.S. Pat. No. 3,278,029. In this case, the employment of interchangeable pneumatic classifying pressure cell units for different material characteristics is disclosed, which units are capable of being placed in any position anywhere along the downwardly traveling bed to give the separator and classifier, the flexibility to receive by gravity feed materials of any varying range and size and specific gravity, to properly pneumatically fluidize the materials as they descend along the bed of the classifier, and permit a draw-off at different locations along the bed of the classifier, of minerals pneumatically suspended and separated from the other materials of preselected size and specific gravity and of other characteristics.

The principal object comprising this invention is the provision of an improved method and apparatus for effective and efficient positive draw-off of minerals or materials, and of materials of predetermined size and specific gravity from a downwardly sloping bed of pneumatically fluidized traveling materials.

Another object comprising this invention is the provision of an improved control means for controlling the amount and quantity of mineral to be positively drawn off at a predetermined location on a downwardly sloping and pneumatically suspended mineral bed by an interchangeable pneumatic classifying pressure cell unit employed in a pneumatically operated separator and classifier.

Another object comprising this invention is the provision of a control means to periodically check or varying the rate of positive draw-off of minerals or materials to be positively drawn off at predetermined locations on the downwardly sloping and pneumatically suspended mineral bed through an interchangeable pneumatic classifying pressure cell unit.

Another object comprising this invention is the provision of tune-metering rollers, belts, valves or other comparable structures in each classifying draw-off cell unit to positively draw and feed off at a predetermined rate of flow, a mineral or material of a predetermined size and specific gravity and, when the materials are undergoing stratification from other materials of different size and of the same or different specific gravity, although such materials may be of the same mineral composition or substance as the drawn-off mineral of predetermined size and specific gravity. This distinguishes from the prior art in that each draw-off is positive and power actuated, to be truly effective and not merely a constantly open draw-off depending on gravity and the mere downward movement of the bed.

Another object comprising this invention is the provision of an adjustable dam at the classifying positive draw-off cell unit location where the mineral of predetermined size and specific gravity is to be drawn off from the downwardly sloping bed of traveling material to direct the preselected material, to be classified and separated from the rest of the material mass, into and through the classifying cell unit. The height and width of the dam may be varied according to the predetermined size and specific gravity of mineral to be withdrawn at the classifying cell unit location. The width of the opening in front of the dam may also be selected or regulated. All of these regulatable factors aid in producing an accurate and complete classifier that one is unable to obtain from the prior art.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
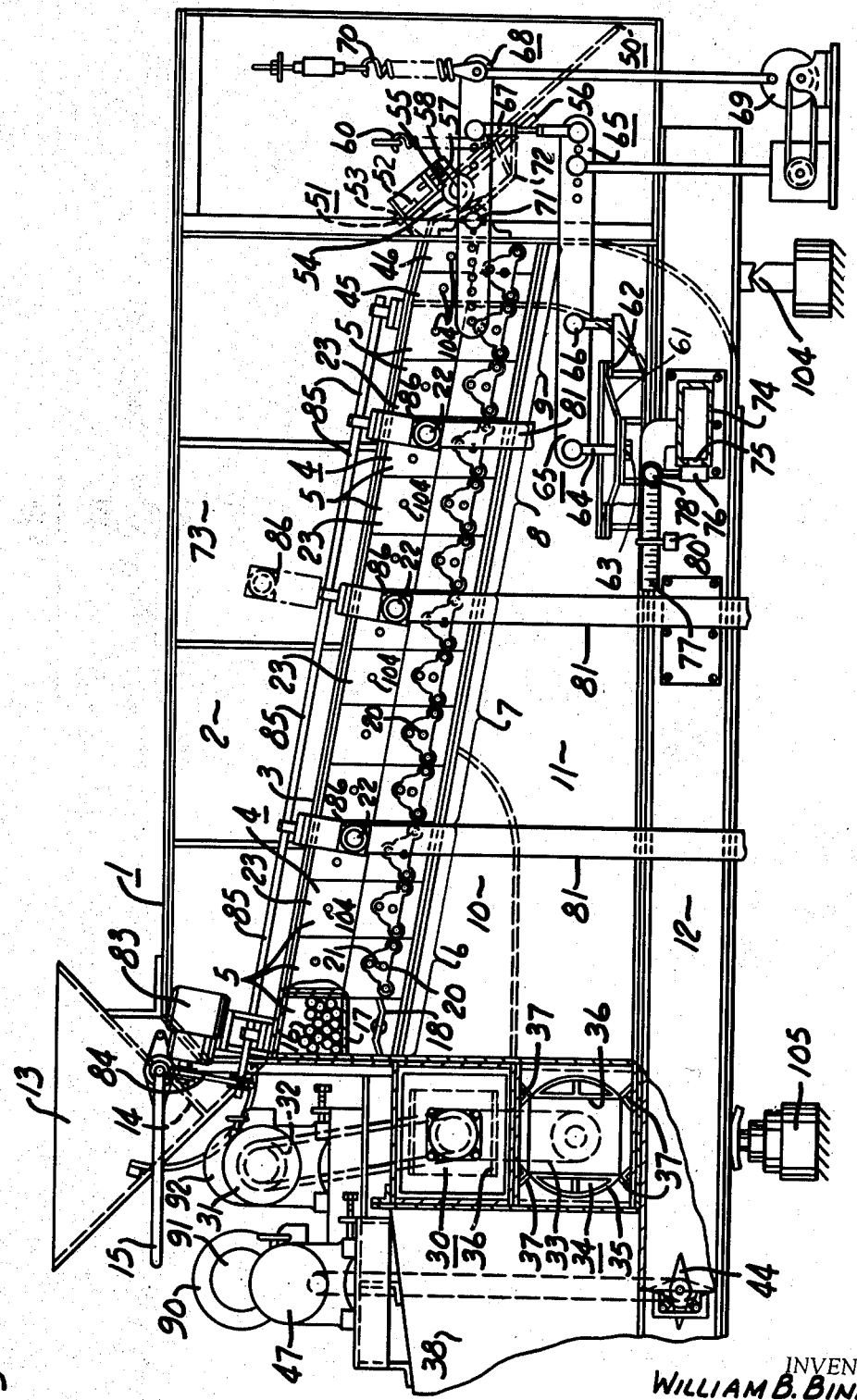
FIG. 1 is a longitudinal view partly in vertical section illustrating the classifier having individual and independently replaceable draw-off cells comprising this invention.
Figure 2:
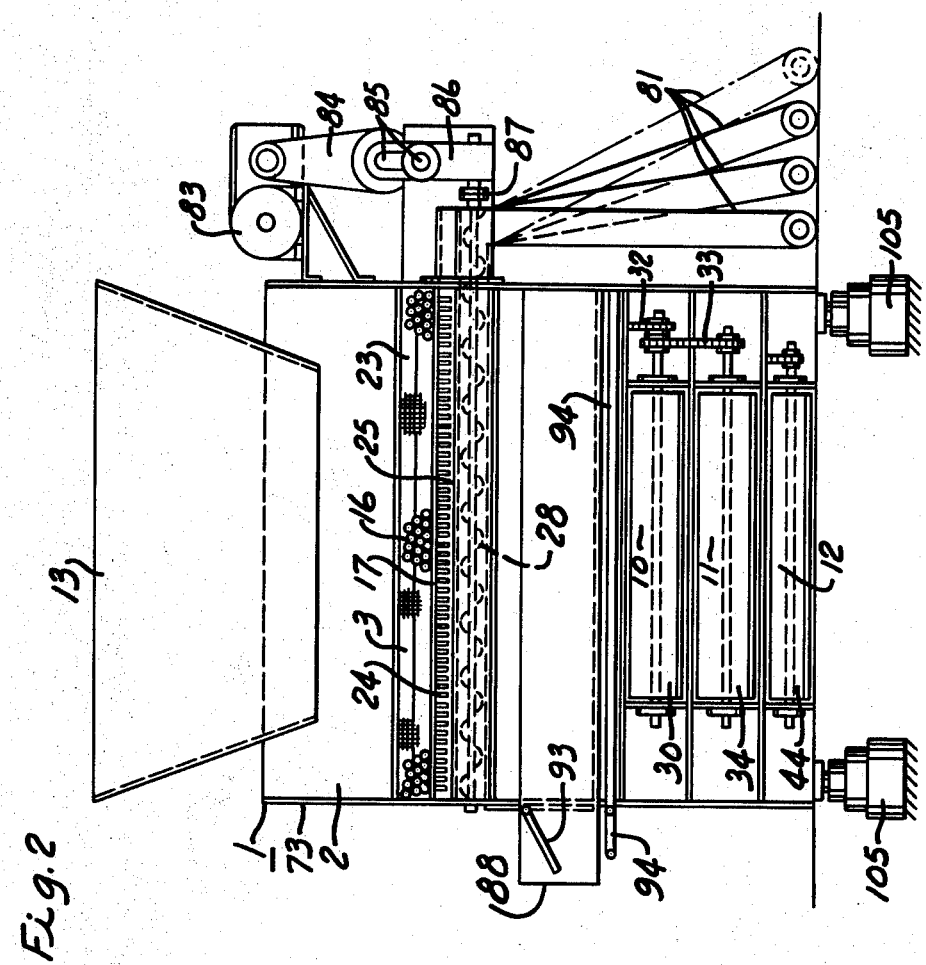
FIG. 2 is a rear view of the classifier shown in FIG. 1.
Figure 3:
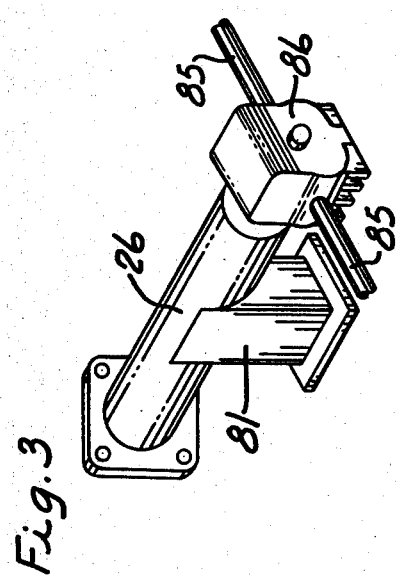
FIG. 3 is a perspective view of a take-off for an intermediate classifying cell.

Referring to the FIGS. 1, 2 and 3 of the drawings, the mineral classifier comprising this invention is an extension of the structure of the pneumatic stratifier. This classifier does stratify the mineral bed and does pneumatically float the bed so that the bed as a whole floats down over the screen to the principal separator with an opening therebelow leading to a gate at the lower end of the bed. However, in this invention each of the marble cells are removable and may be replaced by marble cells having different flow characteristics which are necessary to pulsate that portion of the bed to effect a classification where the selected mined material or mineral will be removable.

Thus, not only do the marble cells differ from one another but so do the classifying cells which have a positive draw-off for the classified material and thus differentiate this structure from a pure separator. Adjacent cells, although they each pass a pulsating pneumatic pressure, will vary in pressure and in pulsating frequency together with volume to perform a specific rapid classification and separator of the minerals along the bed before the gate.

The framed enclosure 1 has five different chambers, the material chamber 2 above the bed which lies on the downwardly sloping screen 3. The second chamber 4 contains the marble cells 5 directly under the bed screen 3 which is divided into four different sections, 6, 7, 8 and 9, the latter actually being separated into two pressure divisions. It will be noted that each of these sections are terminated by a classifying lateral draw-off except the last section 9 which ends at the dam and gate at the lower end of the bed. Thus, a draw-off classifier limits the section and the length and number of sections chosen and this may vary depending upon the minerals to be classified and instead of four draw-off units in sections 6, 7, 8 and 9 as shown at 22 in FIG. 4, there are only three in FIG. 1.

The third and fourth chambers 10 and 11 are pneumatic supply chambers that supplies substantially the first and second halves of the bed except where the independent pressure is required which is indicated in FIG. 2. The last pneumatic supply chamber 12 supplies the last two cells under the bed which provides the most dense material on the under side of the moving bed at the gate. Thus, the pneumatic pressures in chambers 6 to 9 may be readily changed or be partially eliminated in setting up this classifier. To set up the classifier an analysis of the mineral to be classified is taken to determine the size and specific gravity of the different minerals or grades of one mineral that are to be considered. This information may be fed to a computer to determine the characteristics of the several cells in each section and thus determining which mineral as well as size is to be positively removed in the respective section. When the cells are set in accordance with this information, the density pressure pulsations and operation of the classification draw-off screw may be selectively determined.

The chamber 2 is supplied with the mineral to be classified which is preferably crushed to a predetermined size that will react to the selected pneumatic pulsating pressures to effect the proper classifications. A hopper 13 is positioned at the upper end of the bed to continuously supply the mineral bed and function as a continuous operating machine. The flow of this material in the hopper is determined by the valve operated by the handle 15. The mineral proceeds down across the screen to the lower end of the bed. The sections 6 to 9 under the screen have a different number and weight marble cells 5 and deliver different pneumatic pressures to the screen depending upon the location of each lateral withdrawal of classified material.

As the mineral proceeds down over the screen in its floating state by pulsating air pressure, the cells 5 are interchangeable and each cell contains the pack of marbles 16, preferably glass, to diffuse the upwardly traveling air which passes through the screen 3 to suspend the mineral bed and the specific gravity of the minerals determines the relative stratification accordingly. The marbles are in turn supported on the mesh 17. The weight and size of the marbles have a definite effect on the air pressure. However, the valves 18 also regulate the air pressure traveling to and through the marbles in each cell which diffuses the pulsating air. These valves 18 are of the vane or butterfly type, each secured to their shaft 20, operated by the indicating handle 21 and which together with the depth of the marble pack and the initial air pressure supplied thereto determines the amount of air admitted to that section of the screen 3. Thus, the particular arrangement of the marble packs 16, the air valve 18, the pneumatic air pressure supplied to each cell 5 is one of the determining factors for the proper point or position of a classifying draw-off unit along the sloping screen 3.

In classifying, as in separating by stratifying, the particles of heavier specific gravity are interspaced in throughout the introduced mineral bed. The particles of heavier specific gravity tend to sift to the lower strata of the bed. In the initial part or first quarter of the bed the smaller sized particles of heavier specific gravity have a tendency to get to the lower strata on screen 3 because of their size and the the fact that there is no heavy concentration in the lower strata of the bed of high specific gravity particles making up an impenetrable strata. Thus, small and medium sized particles of low and high specific gravity may be removed in the first three draw-off cells. Size as well as the specific gravity of the particles drawn off laterally increase toward the lower end of the bed where the cells provide a special pneumatic characteristic for suspending a highly concentrated strata of the bed and the greatest separation is effected by a gate.

Figure 4:
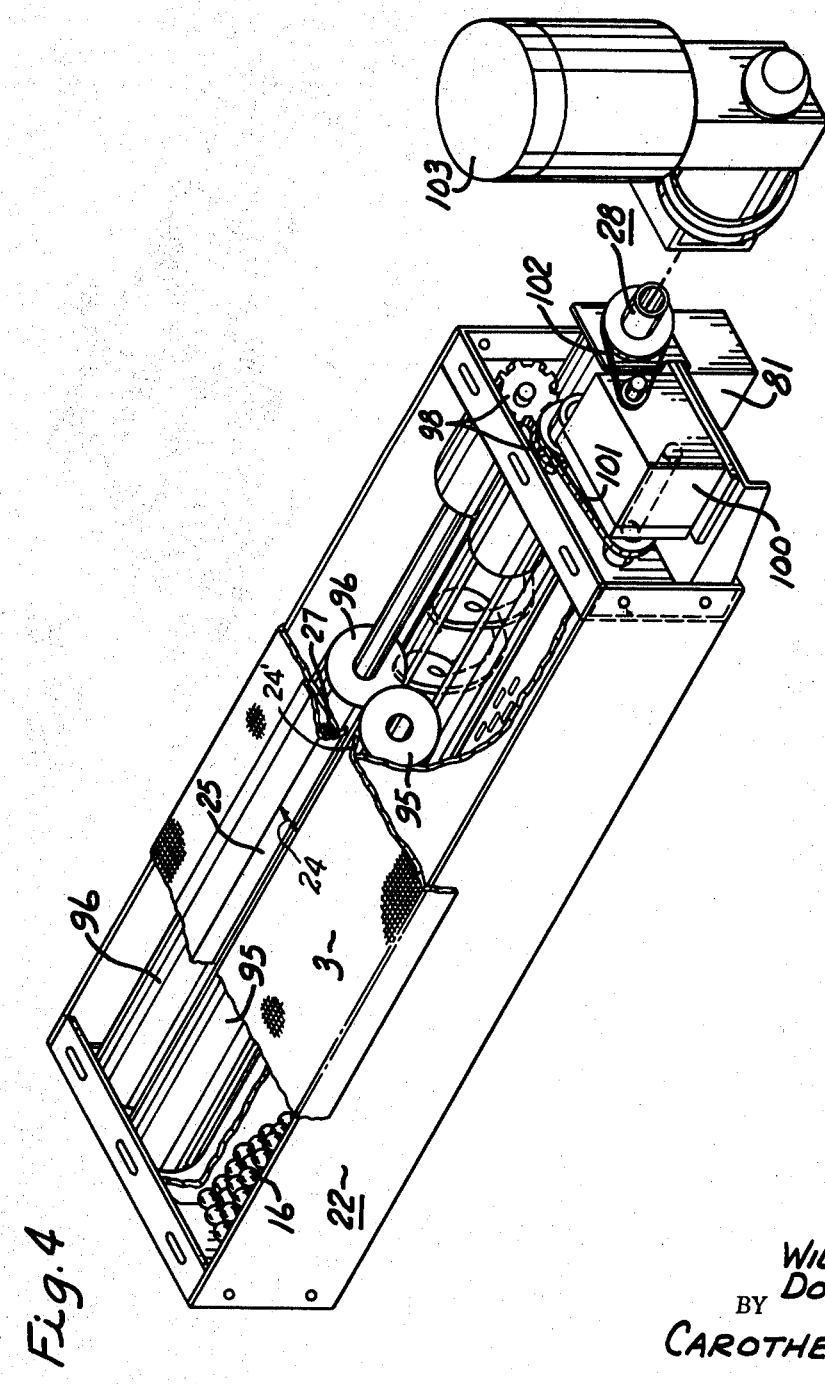
FIG. 4 is a perspective view of one interchangeable cell with tune-metering take-off rolls without a drive motor.

However, these intermediate take-off units 22, as illustrated in FIG. 4, are three in number and each provide a special marble pack 16 at the forward end of the cell and intermediate a special opening 24 which at its forward end is flush with the perforated screen 3. In each instance, the screen section 3 and opening 24 having formed at one side the sloping surface and on the opposite side the adjustable dam 25, and which may or may not be a part of the classifier unit 22, and when the classifier 22 is in place it forms the screen 3 along with the other pulsating sections regardless of their size opening.

It should be pointed out that the structure shown and described with reference to FIGS. 1, 2 and 4 in regard to the position and number of regular marble pack cells 5 and in these intermediate positive take-off units 22, is merely for purposes of illustration since the number of take off units desired and their relative position along the sloping screen 3 is dependent on the size and specific gravity material to be classified.

Figure 5:
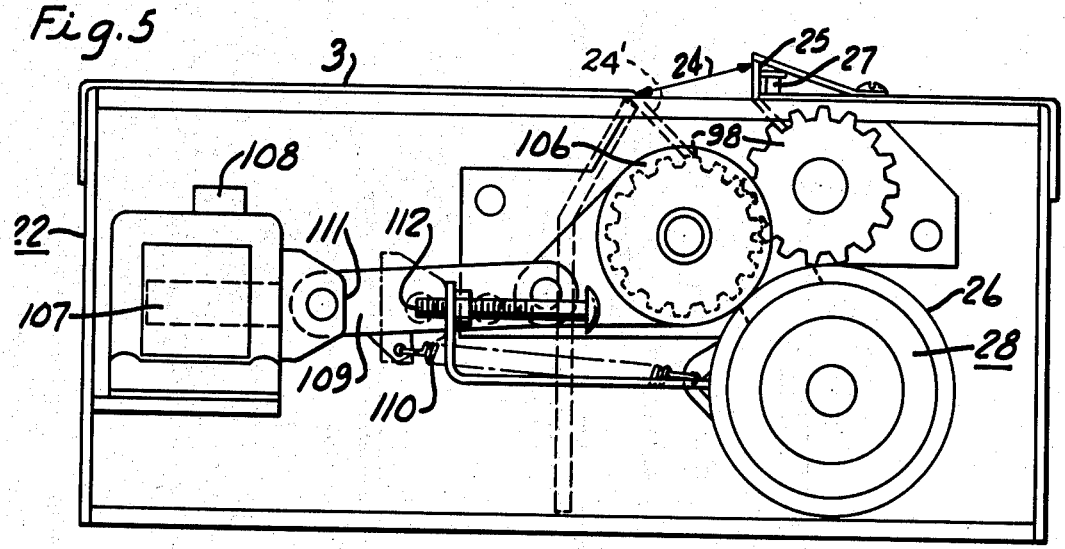
FIG. 5 is an end view of a cell take-off roll having a solenoid drive motor.

The classified material passes through the opening 24 of screen 3 which has a steep slope 24' on one side and a dam 25 on the other side as shown in FIGS. 4 and 5. A transverse opening in the transverse pipe 26 is provided to permit the selected mineral to enter the screw 28 to be conveyed laterally of the machine. The three classifiers 22 are each removable or replaceable or shiftable with each of the cells 5. As shown, three cells 5 precede the first and second classifiers 22 whereas the third classifier 22 has only two preceding cells 5. It is preferable to change the pressure in the preceding cells 5 as well as the classifier cell unit 22 so that the preselected size is determined by the screen. Thus, the screen opening 24 or gauge of the screens 3 is another important factor in drawing off the desired size of material pneumatically fluidized on the sloping screen 3.

As shown in FIG. 1, the first two sections of the cells and the first two classifier units are supplied by the pneumatic chambers 10 and 11, the pneumatic pulsations of which are produced by the rotary valve 30 driven by the variable speed motor 31 and its reducer and chain drive 32. A second chain drive 33 operates the rotary valve 34 in pneumatic chamber 11. These valves have a spherical plug valve 35 with a central passage 36. The adjustable port members 37 cooperate with the spherical plugs 35 to provide a smooth cutoff of the supply of air to pulsate the same. The valves 30 and 34 are out of phase so that the air supplied to their chambers 10 and 11 alternately pulsate at a half the speed of the valve rotation. This being variable becomes a factor in the pneumatic suspension of different minerals and different mineral bed thicknesses. Thus, chamber 10 is pulsed and while chamber 11 is not pulsed they are thus 180° out of phase. Such pulsation and particularly alternate pulsation of the pneumatic pressure aids in pneumatic suspension as well as mineral separation in accordance with specific gravity as well as size.

The duct 38 supplies air for both valves 30 and 34 from a fan driven by a variable speed motor and the chamber 12 in turn is supplied with air from another fan driven by another variable speed motor as disclosed in U.S. Pat. No. 3,965,853. The variable speeds permit a change in volume which is the sixth factor in the control of the supply of air to properly suspend the mineral bed for classification. The alternate zones or even cells that alternately pulsate aids in this classification. The pulsations in chamber 12 are produced by the valve member 44 which is merely a center balanced butterfly valve. This chamber 12 supplies the pulsating air for the last two cells 5 in the chamber 9 wherein the bed 3 has a greater slope. The rotary pulsating valve 44 is driven by the variable speed motor and reducer 47.

Each of the replaceable or exchangeable consecutive cells 5 and 22 are constructed to selectively have the proper effect on the particular mineral bed being treated to positively draw off the proper size and specific gravity whether light or heavy as the bed progresses down the screen. The last two cells 45 and 46 require a considerably greater amount of air at high pressure as the stratified layer of high specific gravity is concentrated at the under side of the bed over these cells.

At the end of the chamber 2 a discharge chute 51 which is rather steep in its inclination and has a depending lip or dam 51 at its upper end. This dam has upper and lower projections 52 and 53 that fit on the top and bottom of the chute 50 which permit the dam member 51 to be removable and changed for different types of run of the mine mineral. It will be noted that the end of the lip edge of the dam 51 is spaced from the screen 3 and this spacing permits the flow of the reject material from the under side of the stratified bed to the gate 72; whereas the lighter specific gravity will flow over the top of the dam 51 and pass down the chute 50 cleaned of all its reject. The chute 50 rests on the cam 54 which is mounted on the shaft 55 rotated by the hand lever 56. Thus, different positions of the lever 56 will cause the cam 54 to vary the height of the chute 50 and thus the opening between the bottom edge of the dam 51 and the screen. A stop 57 prevents further movement of the abutment member 58 on the shaft 55 to limit the upward movement of the lever 56. The spring 60 is attached to the lever 56 to maintain the movable abutment 58 against the stop 57 and thus at all times maintain a constant opening between the bottom of the dam 51 and the screen 3. If for some reason a large chunk of material descends in the pneumatically suspended bed and tends to clog this opening under the dam, one need only to manually depress the lever 56 and the cam 54 will raise the chute 50 and the dam 51 to permit the large piece that is blocking the dam to pass therethrough to reject. The mere release of the handle 56 causes the spring 60 to move into its fixed position against the stop 57.

The air chamber has exposed thereto a servomotor of pneumatic type containing a flexible diaphragm 61 which is fastened between the annular rings 62 and the center of the diaphragm is provided with the plates 63 which permit it to be attached by the link 64 to the lever 65. The lever 65 is fulcrumed at 66 and its other end is provided with the link 67 that connects to the second lever 68 of the system. The link 67 may be adjusted along the levers 65 and 68 to provide for different weights of the reject material. The end of the lever 68 is supported by the spring 70 and its intermediate portion is secured to 71 and fulcrumed thereby. This fulcrum can be changed in its position along the lever 68 by means of the many holes provided. Thus, the lever 68 is adjustable relative to the lever 65 as well as the link 67.

The fulcrum 71 of the lever 68 carries and is selected to the refuse gate 72 which receives and retains all the refuse that flows under the dam 51. The refuse is held on the gate 72 by reasons of the lever system and is opened only when the air effective on the diaphragm 61 is of sufficient pressure which indicates that the air supplied to cells 45 and 46 is having a very difficult time pneumatically suspending the bed of coal just above the dam 51. As the reject strata in the bed on the screen 3 becomes very dense, the pressure in the pneumatic supply chamber 12 increases. This dense material is, of course, a measurement of the weight of the reject and since the high density resists the flow of air therethrough and creates an increased pressure on the diaphragm 61 raise the left end of the lever 65 which will be rotated clockwise and pull downwardly on the link 67 to pull the lever 68 against the tension of the spring 70 and will open the gate 72 by lowering the same and allow more or less reject to flow from the gate and the end of the screen 3.

A timer motor 69 is provided with a crank that operates through one complete turn and pulls on the lever 68 against the tension of the spring 70 to open the dam periodically as a time-metering device. However, this control is extended. If the denseness of the material causes the diaphragm 61 to operate several times to open the gate 72 within the period for which the timer control motor 69 is set to operate then the control timer motor 69 is operated by the lever 65 as shown and previously described. Thus, the number of times the diaphragm 61 operated the gate 72 within the timer period determines the setting to be made for the initial operation of the timer. For example, if the timer motor is set to operate every 1 to 3 minutes and the diaphragm 61 was called upon to open the gate 72 three times in a period of 3 minutes then the lever 65 operates the timer motor 69 to energize and operate its crank through one 360° to open the gate 72 and the time cycle of the timer motor would then continue from the end of this operation. The new starting time for timing motor 69 would then be the usual minute period or for whatever time it was set. The reason for this is that the timer motor 69 opens the gate 72 in accordance with the length of the crank arm which is greater than the usual travel of the gate 72. Thus, the open gate would quickly clean out the collection of the heavy specific gravity materials tending to unbalance the operation of the system. These combined functions result in improved classification of the material.

The pulsating air pressure in the chamber 12 is effective to vibrate the lever system in the period of the pulsations of air which vibration makes the lever system sensitive to slight variations in pressure and the gate 72 is thereby maintained open to the proper amount for the exit of the reject at a speed correlated with the density of the reject in the last portion of the screen. With the combined operation of the gate 72 by the timer motor 69, in this manner a very high degree of accuracy is maintained in the separation of reject by this gaseous suspension classifier. This actually improves the classification ahead of the gate and dam in taking the intermediate draw-offs.

When a plurality or even where substantially all of the cells along the bed of the machine are draw-off units 22, the projections 52 and 53 the dam 51 may be completely eliminated from the separate discharge chute 50 as well as the gate 72 with all of its control elements therefore, thus terminate the machine length with the end of the last two cells 45 and 46 of the machine. This is due, of course, to the multiple number of draw-off units 22 involved in such a machine.

Even with a plurality of draw-off units 22, it may also be advisable to modify the gate or dam structure at the end of the machine due to the particular size and specific gravity of the material being classified by employing a constant minimum opening at the end of the screen 3. Under such circumstances, it would not be necessary to use the pneumatic balance through the diaphragm 61 but would be advisable to use the timer motor 69 that periodically opens gate 72 at predetermined time intervals which may be in time periods calculated in minutes. For example, with such an operation one may obtain from a selected material to be classified as to size having a 13 percent 160 gravity sink a reduction to 4 percent 160 gravity sink.

The sides 73 of the chamber 2 may be made of a clear plastic. Such plastic side walls may be made of methyl methacrylate and will last a considerable length of time which is rather difficult to understand as one would think that such a material would become scratched by the particles traveling therethrough. However, the methyl methacrylate is found to stand up far better than that of glass which is much harder and it permits the operator to frequently view the stratification of the reject in the pneumatically suspended pulsating bed.

The lateral throat 74 connecting the chamber for the diaphragm has the valve opening 75 on one side thereof which is closed by the valve 76 attached to the valve bell crank lever 77 having a fulcrum at 78 and carrying a poise 80. The poise is adjustable along the horizontally disposed arm of the bell crank 77 in the manner of that of a beam balance. The pressure that the poise exerts on the valve opposes the internal pneumatic pressure of the fifth chamber 12. Thus, the area of the valve 76 that is exposed together with the weight of the bell crank and poise must be calibrated against the air pressures built up in the chamber 12 for different coal having varying amounts of bone, slate and other waste. This bell crank arm is also readily operable by hand.

It should be noted that the valve 76 is out of the way of the path of flow of air so that the actual movement of air is ineffective on the valve.

In FIG. 1, the variable speed motor 83 operating through the speed reducer to drive the belt 84 operating the kelly bar drive shaft is also a time-metering device since it operates the metering feed rolls 95 and 96 in each of the take-off cells 22.

In FIGS. 1 and 2, the kelly bar shaft 85 is supported by bearings above the position of the sloping bed 3 and the right angle takeoff drives 86 are hanging from the kelly bar drive shaft. Each of the drop chutes 81 pass to individual bins or to a common horizontal conveyor not shown. This suspended type drive when turned upwardly permits free access to all of the other cells 5 permitting them to be readily changes to suit the classification changes required.

As shown in FIG. 2, an air duct 88 is positioned along the same slope as the bed and below the cells 5 and the valves 18 and actually at the top of the air chambers 10, 11 and 12. This duct 88 is supplied with an independent source of air pressure indicated by the blower 90 operated by the motor 91 and pulsated by the valve 92, operated from the motor 31 as indicated in FIG. 1.

The duct 88 has a gate 93 and a long slide valve 94 for each cell position to isolate that cell from the respective chambers. There are times when both the pulsating air from the duct 88 as well as the pulsating air from the chambers 10 or 11 or 12 should be employed at the same time on the same cell or classifying take-off cells 22 in which case the valve or gate 93 is opened and the slide valve or gate 94 is not put in place. With this combination, most any desirable pneumatic pulsating pressure may be produced along any one of the cells 5 or the classifying take-off cells 22.

Thus, each intermediate take-off cell 22 shown in FIGS. 1 and 4, has a screen with openings selected to draw-off certain sized materials. Assuming that the material is separated in groups ranging as follows: (1) three-fourths inch to one-half inch, (2) one-half inch to three-eighths inch, (3) three-eighths inch to one-fourth inch, (4) one-fourth inch to one-eighth inch, and (5) one-eighth inch to 28 inch mesh. Of these five groups, a run of material may be 15 percent to 25 percent for each of the five groups which would total 80 percent for the run and the final 20 percent of the run would then be less than 28 mesh as the sixth group. These ranges may, of course, be different for different minerals as well as for different materials that are not minerals. This run may be a raw batch of material. The separation may, of course, include a greater number of groups for the run. The screens permitting these intermediate take-off are made to admit the sizes of materials for the selected group. The width of the openings must be as long and as wide as the particle and it must be for selected thicknesses. Thus, it may be necessary to rerun the group to obtain different thicknesses as well as length and width assuming that the thickness may be as much or greater than the width of the particle.

To make the last cell 22 the draw-off cell for the particles of the desired group, the preceding cells 5 must be regulated to handle and suspend the bed of material above the screen at the take-off position to allow that size range group with its specific gravity to ride along the bottom of the downwardly flowing bed. It may take two cells 5 or three cells 5 to accomplish this feat. Again, the regulation of the bed suspension of these cells has to be such that this selected size will go or stay on the screen to be selected for this draw-off cell width at this particular position on the bed. The screen deck may be vibrated to aid in this draw-off at the cell units 22.

Also, as noted before, due to size and specific gravity of the material being classified it may be necessary to employ a majority of draw-off cell units 22. Such a case would be where the material is easily and therefore almost pneumatically fluidized on being received upon the upper end of the screen 3 in view of its lower specific gravity characteristic. Further such material may be of a variety of sizes which are readily drawn off consecutively according to size.

It should be noted that a particular size of material withdrawn from the pneumatically fluidized bed of material is also governed by the mesh of the screen 3.

The pneumatic suspension of the bed may be considered as a fluidized bed. The greater the specific gravity of the material the greater the degree of slope to the horizontal is required and the greater the fluid or pneumatic pressure is required. A minimum slope may be from 6° to 8° and a maximum slope may be from 12° to 15°. It was discovered that a predetermined pressure and a predetermined slope may be selected to obtain classification of a specific size range of particles of a specific gravity. The rear of the machine frame is supported on jacks 105 which when raised or lowered change the degree of slope of this bed. The air valves and the speed of the fans determine the air pressure supplied to the marbles which likewise affect the flow and pressure. Thus, a separator machine is programmed by these variables to produce a predetermined classification as to particle size and specific gravity along the length of the bed. Such classification is successful for minerals such as gold or for such materials such as potash. The classification is selected and drawn off which is impossible with the operation of this machine as a mere coal stratifier with one intermediate take-off of slate and a final separation of the stratified layer at the lower end of the bed.

As shown in FIG. 4, the opening or throat 24 feeding material to the cells 22 and defined by the steeper portion of the screen 3 and the dam 25, directs the selected material into the nip of the parallel metering rolls 95 and 96 that are in surface engagement. The shafts supporting these rolls are journaled in the flanged end walls of the cells 22. The dam 25 is made adjustable vertically by the wedge means 27 adjustably operable from the end of the cell wall. Thus, the height of the dam 25 above screen 3 is an effective measure of the amount of materials that are selected to pass through the throat opening 24 of the cell 22.

The metering rolls 95 and 96 have plyable or resilient surfaces or sheathes 97 which compress to allow the selected materials to pass therebetween. The shafts carrying these rolls are journaled in the end walls of the cell 22 and at least at one end are provided with intermeshed spur gears 98 to prevent surface slippage between the rolls.

One of the spur gears 98 is timed by being driven from a variable speed drive unit 100 through a chain 101. The variable speed 100 is in turn driven by chain 102 from the auger shaft 28 driven by the variable speed motor unit 103 which may also be employed to vary the metering or timing of the rolls 95 and 96. This variable speed motor unit 103 may have a top speed of 1,800 r.p.m. It may also be varied from 350 r.p.m. to 850 r.p.m. for coal with a general average approximately 750 r.p.m. This variable speed motor unit 103 may be of variable AC or DC motor power.

The time-metering rolls 95 and 96 are inturn preferably driven at a constant speed of from 33 to 50 r.p.m. which may be independently controlled from the variable speed drive 100 for metering a predetermined material.

The auger 28 empties into the vertical chute 81. The auger shaft continues over the motor drive 103.

Figure 6:
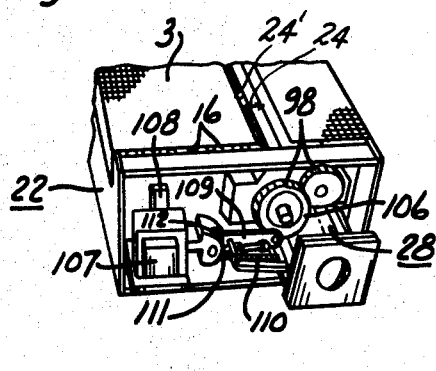
FIG. 6 is a perspective view of the structure shown in FIG. 5.
Figure 8:
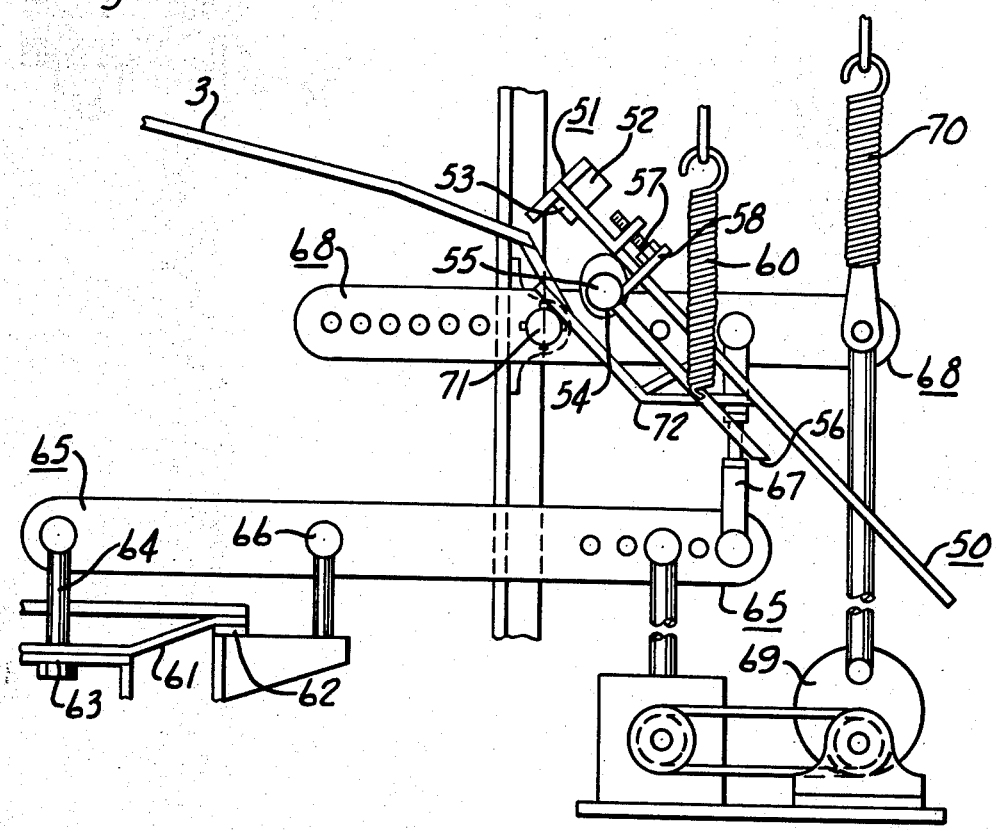
FIG. 8 is a view in vertical section with parts broken away showing the dam on the discharge chute and the refuse gate with their operating parts.

The classification cell 22 of FIGS. 5 and 6 is similar to that of FIG. 4 with the exception of the drive for the time-metering rolls 95 and 96. Here the shaft of the roll 95 has a clutch 106 pivoted thereon. This clutch grips and rotates the shaft of the roll 95 in a clockwise direction when the solenoid 107 is energized as shown in full lines in FIG. 5. This solenoid is preferably AC but may be DC operated and is controlled by the timer 108. This is preferably a pulse timer 108, which when it energizes the solenoid 107 its armature draws the pivotally connected link 109 to actuate the clutch on its power stroke clockwise to rotate the roll 95, in the same direction and through the gears 98 to move the roll 96 in the opposite direction or counterclockwise.

When the solenoid 107 is released by the pulse clock timer 108 the spring 110 connected at one end to the motor link and at its other end to the tube 26 retracts the solenoid armature and link 109 with the armature end 111 engages the end of the adjustable stop screw 112 and thus, by timing the operation of the solenoid by spacing of the operating pulses one can determine the r.p.m. of the metering rolls 95 and 96. The timer 108 may be adjusted to operate in the following range:

| TM 560 DIAL: | Range in seconds |
|---|---|
| A-1 | 0. 1–1. 5 |
| B-1 | 0. 12–6 |
| C-1 | 0. 3–15 |
| D-1 | 0. 6–30 |
| E-1 | 1. 2–60 |
| F-1 | 2. 4–120 |

The auger 28 will be continuously rotated by the motor 103 of FIG. 4.

In FIG. 6, the solenoid 107 is shown in the deenergized position.

Figure 7:
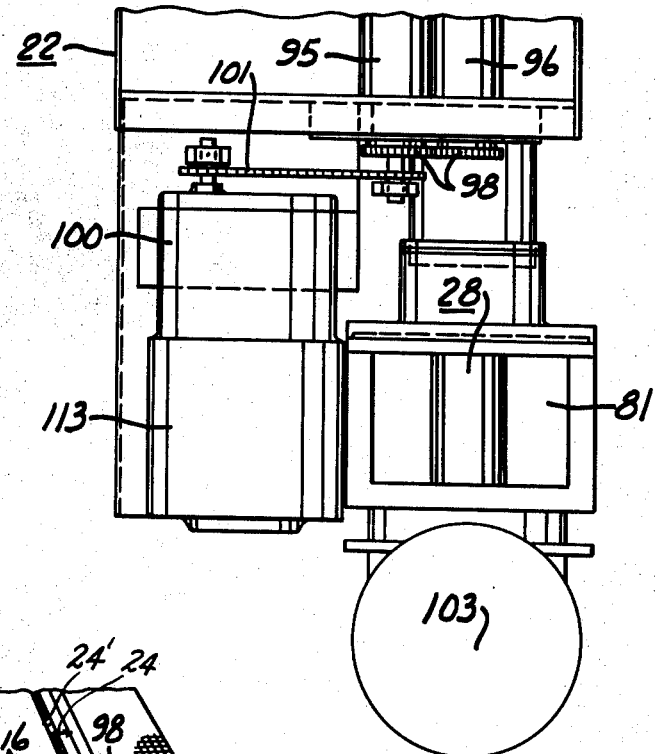
FIG. 7 is a plan view of a constant speed drive of the time metering take-off rolls of a cell.

In the structure of FIG. 7, the gears 98 connecting the time-metering rolls 95 and 96 and the chain drive 101 to the variable and reduction speed drive 100 is operated directly by the motor 113 which may be a variable speed or a constant speed motor. The auger 28 is driven by the motor 103 as shown in FIG. 4.

We claim:

1. The method of classifying materials by intermediate selective removal of materials of predetermined sizes and of predetermined specific gravity from the underside of a downwardly sloping mineral bed supported on a screen and suspended by upward pneumatic pulses causing the bed to flow and stratify for separation toward the lower end thereof, which comprises the step of rotating cooperative engaging surfaces to meter therebetween by positive engagement and withdrawal the discharge of said materials at selected spaced intervals from selected positions along the underside of the suspended flowing bed.

2. The method of classifying materials as set forth in claim 1 including the step of pulsing the operation of the rotary cooperating surfaces to gauge the positive engagement and withdrawal in proportion to the character of the materials being classified.

3. The method of classifying materials as set forth in claim 2 including the step of regulating time periods of pulsing the operation and dormancy of the rotary cooperating surfaces in their positive engagement and withdrawal of selective high specific gravity materials to regulate the withdrawal of such material.

4. The method of classifying materials as set forth in claim 1 including the step of regulating the selective spaced intervals by changing predetermined positions of the rotating cooperative surfaces along the underside of the flowing bed in accordance with the character of the materials making up the bed.

5. The method of classifying materials as set forth in claim 1 including the step of pneumatically pulsing the material prior to positive engagement and removal of the selected materials being withdrawn.

6. The method of classifying materials as set forth in claim 1 including the steps of withdrawing said materials to be metered between said cooperative engaging surfaces through at least one throat opening in said screen underlying said bed, and regulating the extent of the throat opening to regulate the capability of the positive engagement and withdrawal of the desired material.

7. The method of classifying materials as set forth in claim 6 including the step of regulating the height of one side of the opening of the throat to regulate the positive engagement and withdrawal of the desired material.

8. The method of classifying materials as set forth in claim 7 including the step of orienting the mouth of the throat in controlling the positive engagement and withdrawing of the desired materials from the bed.

9. The method of classifying materials as set forth in claim 6 including the step of inducing a rolling cooperative action between the engaging surfaces to provide a feeding nip to positively engage the materials from the underside of the bed to feed and withdraw them through the throat.

10. The method of classifying materials as set forth in claim 1 including the step of maintaining a resiliency in the positive engaging and withdrawing rolling surfaces to selectively accept the material withdrawn and maintain the throat between the rolling surfaces closed.

11. The method of classifying materials as set forth in claim 1 including the step of separating the stratification by dividing the stratification of the flowing bed at the lower end thereof, and timing the operation of the release of the higher specific gravity materials.

12. In a machine for classifying a downwardly sloping bed of materials pneumatically suspended to induce the bed to flow downwardly over a sloping screen to stratify the same, throat means in said screen positioned intermediate the top and bottom ends from which to withdraw selected materials of predetermined size and specific gravity, the improvement comprising rotary cooperative positive engaging surface means positioned below and adjacent said throat means to positively engage therebetween and withdraw the selected materials from the underside of the flowing bed and to regulate the rate of discharge of the selected materials through said throat means from preselected positions along the underside of the suspended flowing bed.

13. The structure of claim 12 characterized by a pulse operating means to actuate said rotary positive engaging surface means in regulating the rate of discharge of the selected materials through said throat means.

14. The structure of claim 13 characterized in that said pulse operating means includes a time regulatable rotary motor.

15. The structure of claim 13 characterized in that said pulse operating means includes a time regulatable reciprocatory motor.

16. The structure of claim 12 characterized by plyable opposed surface means as a part of said rotary cooperative positive engaging surface means to positively engage and pass the material therethrough.

17. The structure of claim 16 characterized in that said plyable opposed surface means functions as a valve means under said throat means in said screen, and metering control means including a timed operated solenoid to regulate the rate and periods of operation and material discharge from said valve means.

18. The structure of claim 17 characterized by a regulator mechanism connected to control the operating time and the nonoperating time of said valve means in its discharge of the material through said throat means.

19. The structure of claim 16 characterized in that said plyable opposed surface means extends in said throat means and are opposed rotary movable contacting surfaces that continuously recede to carry the material therebetween through said throat means.

20. The structure of claim 19 characterized by a regulator connected to control the operating time and the nonoperating time of said opposed movable contacting surfaces through metering control means in their discharge of material between said contacting surfaces.

21. The structure of claim 16 characterized in that said opposed movable contacting surfaces are plyable belt surfaces.

22. The structure of claim 16 characterized in that said opposed movable contacting surfaces are roller surfaces.

23. The structure of claim 22 characterized in that said plyable roller surfaces are in contact with each other and are rotated to form a metering throat therebetween.

24. The structure of claim 22 characterized by a regulator means to control the separation of said opposed movable contacting surfaces to selectively draw materials of different size therebetween.

25. The structure of claim 22 characterized in that said roller surfaces are mounted on rotary driven shafts at least one of which is spring loaded to maintain their roller surfaces toward each other.

26. The structure of claim 22 characterized in that said roller surfaces are of elastomer material.

27. The structure of claim 26 characterized in that said elastomer material is spongy.

28. The structure of claim 22 characterized by a timer to control the operation of said rolls to time their rotation.

29. The structure of claim 28 characterized by a solenoid means to actuate the rotation of said rolls.

30. The structure of claim 28 characterized by a clutch timed to interrupt the rotation of said rolls.

31. The structure of claim 12 characterized in that said positive engaging surface means is a plyable elastomer material.

32. The structure of claim 12 characterized by a dam at the lower end of the flowing bed to separate the higher and lower specific gravity materials, and timer means to periodically release the separated higher specific gravity materials at the lower end of the bed.